(12) United States Patent
Madden

(10) Patent No.: US 8,485,112 B1
(45) Date of Patent: Jul. 16, 2013

(54) MULTI-USE SURFACE

(76) Inventor: Michelle Lynn Madden, Grand Prairie, TX (US)

( * ) Notice: Subject to any disclaimer, the term of this patent is extended or adjusted under 35 U.S.C. 154(b) by 907 days.

(21) Appl. No.: 12/291,783

(22) Filed: Nov. 13, 2008

(51) Int. Cl.
*A47B 13/08* (2006.01)

(52) U.S. Cl.
USPC ............... 108/90; 108/97; 150/154; 16/17.1

(58) Field of Classification Search
USPC ........... 108/90, 27, 97, 98; 150/154; 248/615, 248/687, 689, 220.1; 16/4, 17.1
See application file for complete search history.

(56) References Cited

U.S. PATENT DOCUMENTS

| | | | | |
|---|---|---|---|---|
| 1,468,372 A * | 9/1923 | Bendlin | ................ | 248/689 |
| 2,861,386 A * | 11/1958 | Altmann et al. | ........... | 52/782.23 |
| 3,915,528 A * | 10/1975 | Glickman | ................ | 312/229 |
| 4,137,356 A * | 1/1979 | Shoemaker et al. | ....... | 428/211.1 |
| 4,177,846 A * | 12/1979 | Rountree | ................ | 108/90 |
| 4,953,823 A * | 9/1990 | Sheaffer et al. | .......... | 248/346.11 |
| 4,978,566 A * | 12/1990 | Scheurer et al. | ............. | 428/157 |
| 5,208,084 A * | 5/1993 | Rutz | ............ | 428/40.1 |
| 5,306,544 A * | 4/1994 | Pommeranz et al. | ....... | 428/195.1 |
| 5,829,627 A * | 11/1998 | Martindale | ............... | 220/666 |
| 6,022,617 A * | 2/2000 | Calkins | ................ | 428/354 |
| 6,116,162 A * | 9/2000 | Santa Cruz et al. | ............ | 108/27 |
| 6,619,813 B1 * | 9/2003 | Schnell | ................ | 362/116 |
| 6,703,110 B2 * | 3/2004 | Stitchick | ................ | 428/156 |
| 6,746,735 B2 * | 6/2004 | Snedeker | ................ | 428/34.1 |
| 6,912,959 B2 * | 7/2005 | Kolody et al. | ................ | 108/28 |
| 7,182,993 B1 * | 2/2007 | Hamilton | ................ | 428/100 |
| 7,674,002 B1 * | 3/2010 | Wang | ................ | 362/183 |
| 2002/0160184 A1 * | 10/2002 | Cho | ................ | 428/351 |
| 2006/0180056 A1 * | 8/2006 | Dorholt | ................ | 108/90 |
| 2010/0102197 A1 * | 4/2010 | McIntyre | ................ | 248/687 |

* cited by examiner

*Primary Examiner* — Darnell Jayne
*Assistant Examiner* — Daniel Rohrhoff

(57) ABSTRACT

A multi-use work and play area attachable to a table surface by a generally 'J' shaped spring hinge assembly, that inhibits the scattering of manipulated articles, and offers protection of young children from injury associated with striking the edge of a table inadvertently with their arms, hand or head. The multi-use surface may also be used by adult hobbyists or craftspeople working with small articles that may be misplaced easily.

13 Claims, 6 Drawing Sheets

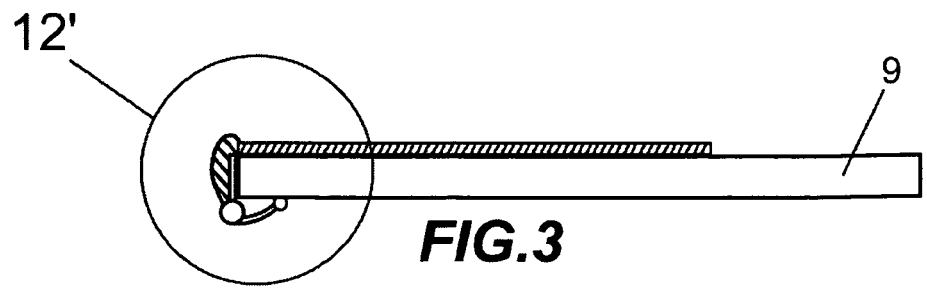
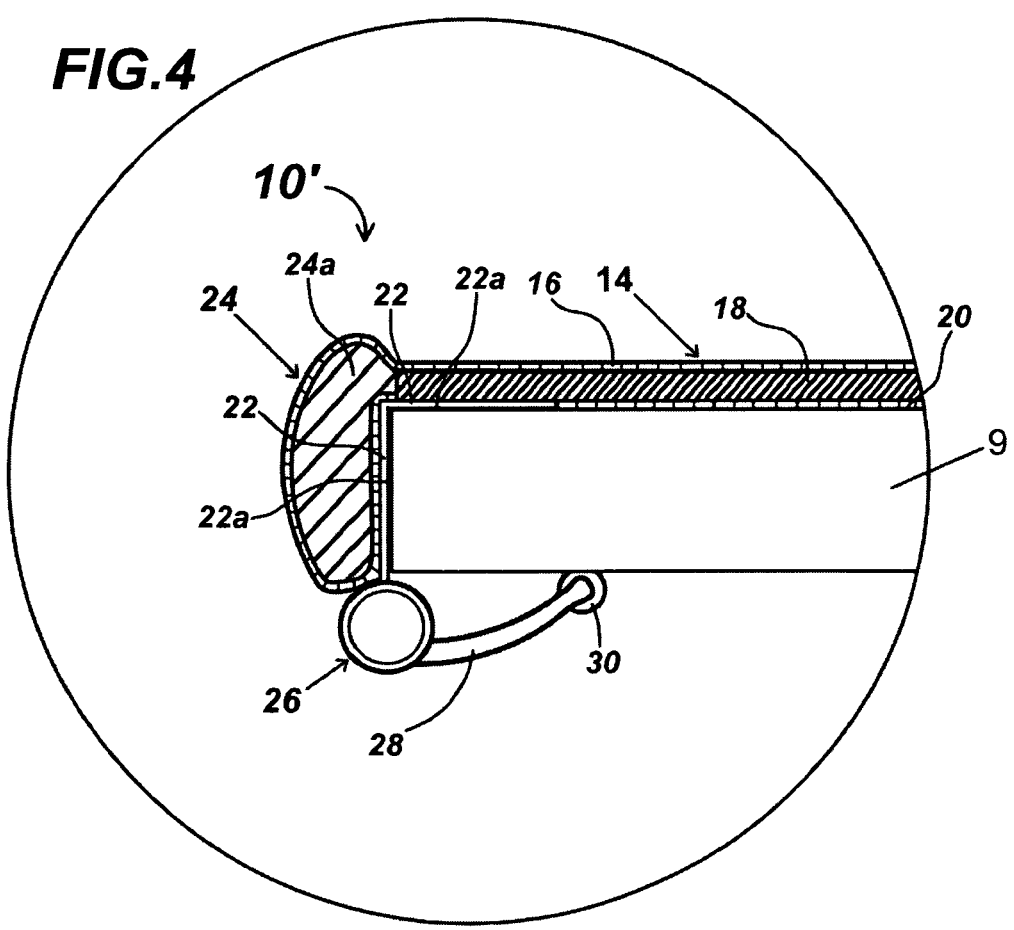

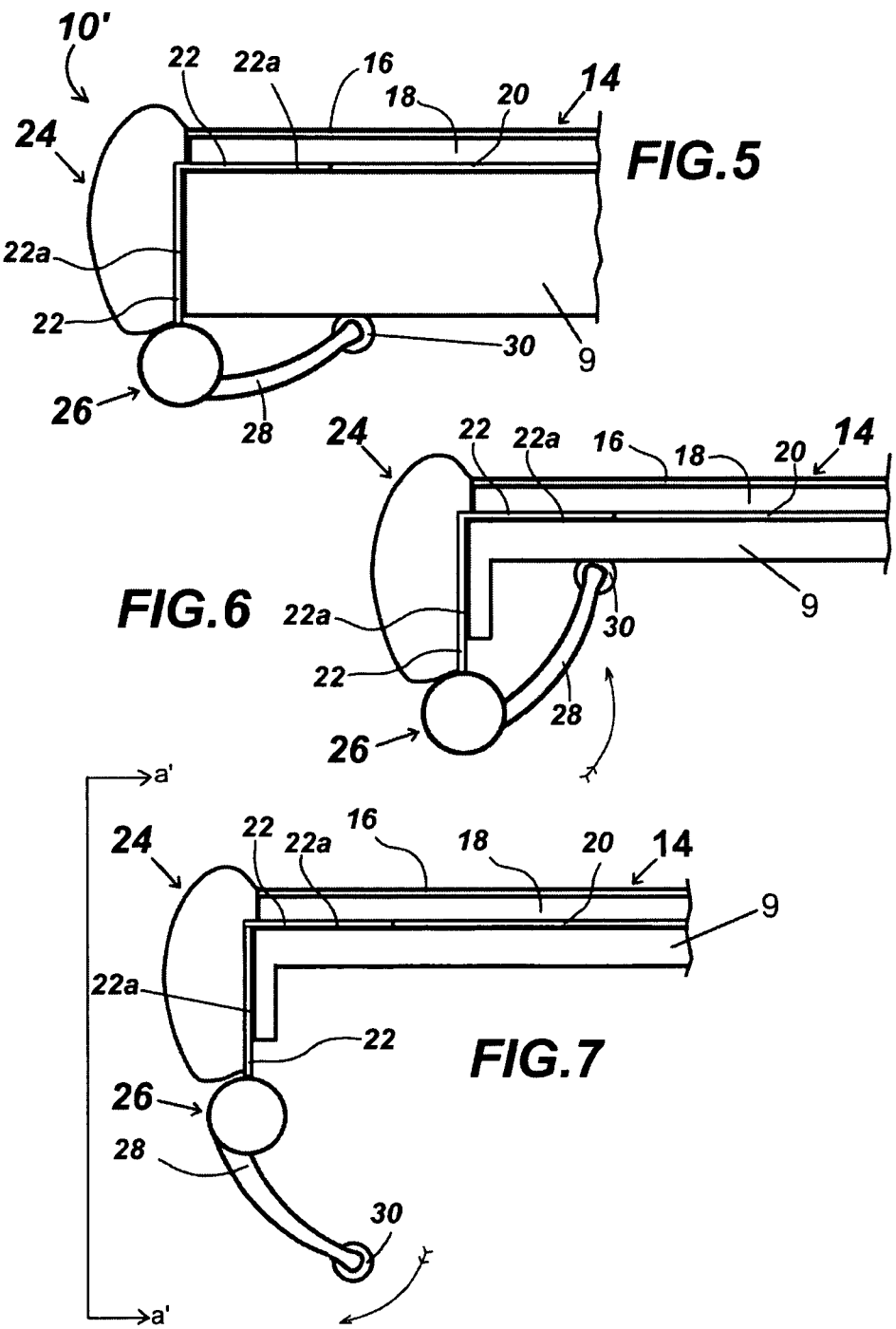

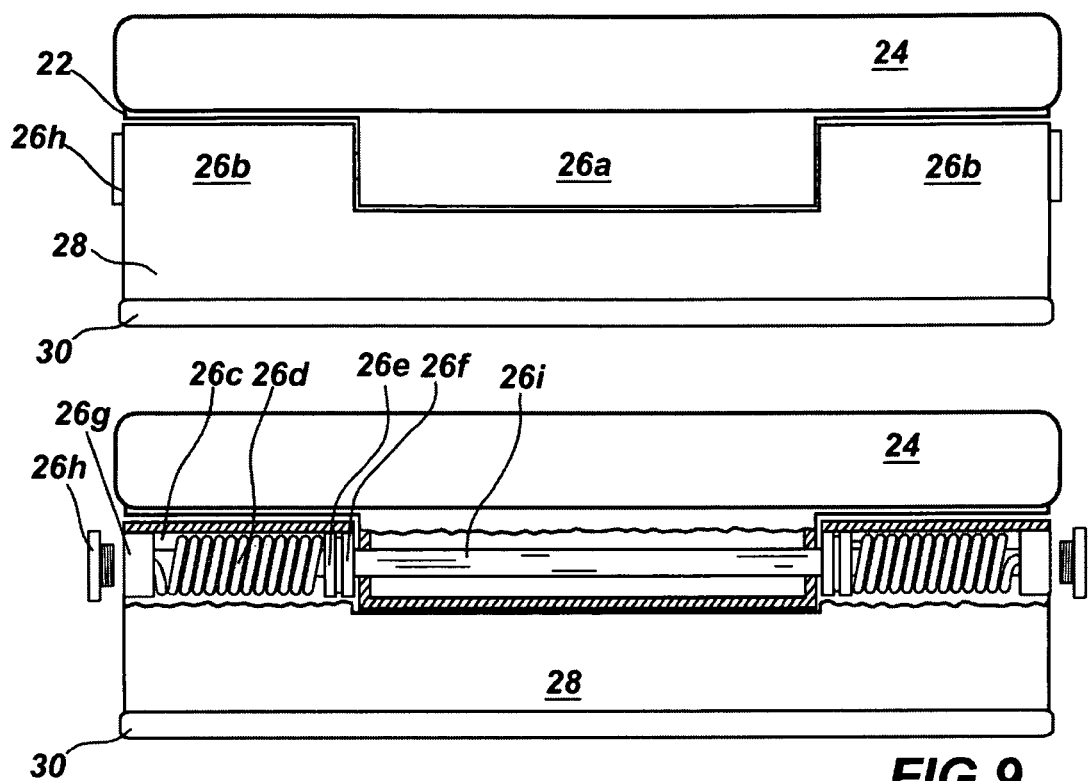
FIG. 8
FIG. 9
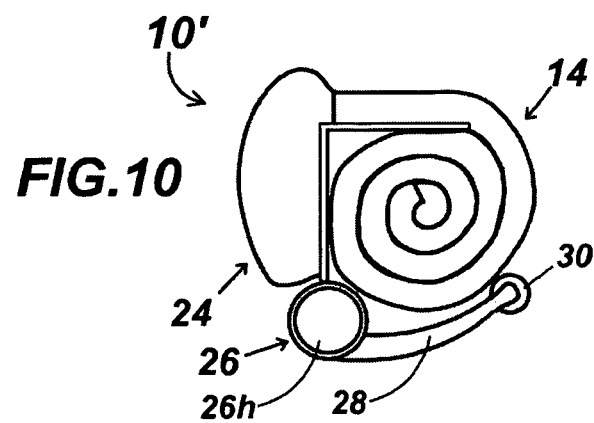
FIG. 10

MULTI-USE SURFACE

CROSS REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND

The present invention relates generally to a work and play area and specifically to a work and play area being attachable to a table edge.

It is often the case that objects and small articles being manipulated over a table top tend to get scattered even to the point of falling off the table. This is true in the case of adults working with for example, small parts, and young children that may involuntarily scatter playthings, utensils and food containers. Some work mats fitted to a table top have been proposed to aid with the containment of small items, but do not sufficiently address the needs of children. One frequently encountered problem occurs when families dine out and have young children that may risk injury by involuntarily striking the table edge with their arms or head when seated at a lower than desired level relative to a table top height. What is needed is a work and play area to help localize materials allowing a child to move normally without risk of injury.

SUMMARY OF THE INVENTION

The present invention overcomes the aforementioned problems by providing a multi-use surface that may be clamped securely to table edges of varying thicknesses and includes an extendible mat to work, play or eat on, and a padded bumper forming a ridge between a user and an extendible mat to prevent injuries and aid in the localization of table top articles. A generally 'J' shaped clamping assembly is connected to the extendible mat and includes an upper fixed member and a movable lower member joined in a hinging arrangement to secure the multi-use surface to a table top. The present invention is readily cleaned and easily packed for transport.

One object of the present invention is to provide a means of localizing small articles to a table top affixed multi-use surface.

Another object of the preset invention is to provide a space saving multi-use surface that may be secured to a table's edge.

Another object of the present invention is to provide a portable multi-use surface that discourages scattering of manipulated articles.

Another object of the present invention is to provide a portable multi-use surface that inhibits scattering of manipulated articles.

Yet another object of the present invention is to provide a multi-use surface with a padded bumper between a user and a flattened extendible mat defining a work and play area. Yet another object of the present invention is help prevent injuries to children resulting from children striking their arms or heads against a table's edge.

Yet another object of the present invention is to provide a interesting surface and play area to occupy a child's attention.

Yet another object of the present invention is to provide a interesting surface that may anchor a child's playthings to a work and play surface.

Still another object of the present invention is to provide a multi-use surface to protect a table top from damage arising from manipulated articles within a work and play area defined by an extendible mat member.

For a further understanding of the nature and objectives of the present invention, reference should be made to the following detailed description, taken in conjunction with the accompanying drawings, in which like elements are given the same or analogous numbers in which:

BRIEF DESCRIPTION OF THE DRAWINGS

FIG. 3 is a sectional view taken along lines 8'-8' of FIG. 2;

FIG. 4 is an enlarged detail view of 12' of FIG. 3;

FIG. 5 is an end view of a preferred embodiment according to the present invention showing the bumper, spring hinge assembly and the extendible mat attached to a solid table edge without a lip;

FIG. 6 is an end view of a preferred embodiment according to the present invention showing the bumper, spring hinge assembly and the extendible mat attached to a table edge with a lip;

FIG. 7 is an end view of a preferred embodiment according to the present invention showing spring hinge assembly in open position which precedes the attachment and detachment of the work and play area from a table edge;

FIG. 8 is a side elevation showing the bumper and spring hinge assembly taken from direction a'-a' of FIG. 7;

FIG. 9 is a side elevation in partial cutaway showing the interior of the bore of the spring hinge assembly taken from direction a' of FIG. 7;

FIG. 10 is end view showing the extendible mat rolled in stored position;

DETAILED DESCRIPTION OF THE EMBODIMENTS

Referring generally to FIGS. 1-15, the present invention 10' is a multi-use surface that includes an extendible mat 14 joined along one length of a generally J-shaped assembly that clamps the present invention to one edge of a table top. The multi-use surface may be used as a work and play area, or as a placemat at a table.

Figure 1:
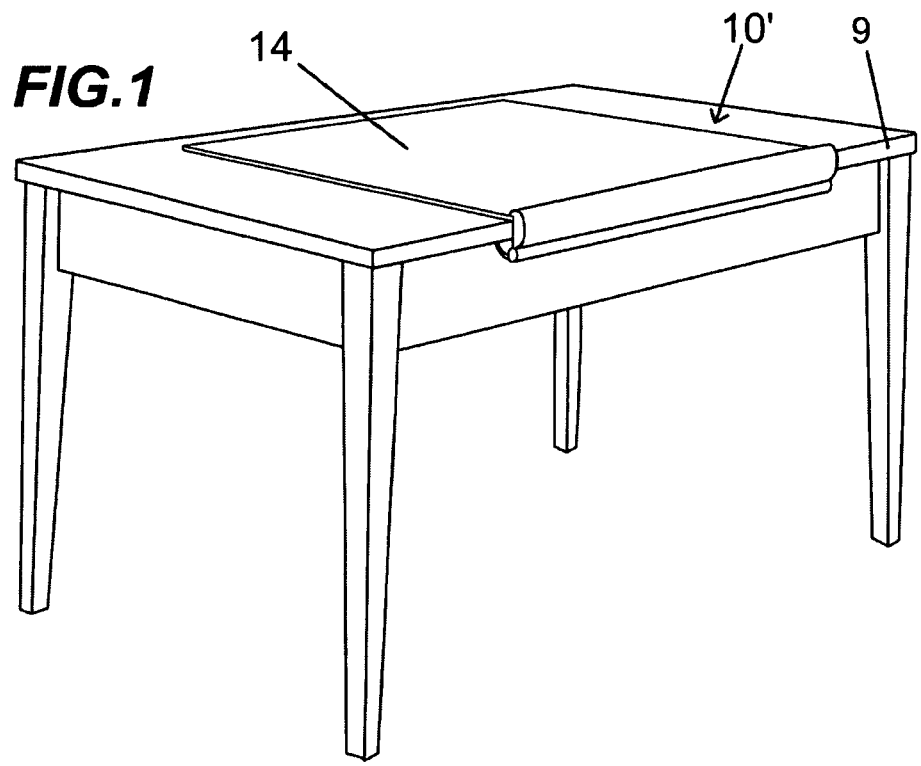
FIG. 1 is a view of a preferred embodiment according to the present invention in typical use mounted on a table top.
Figure 2:
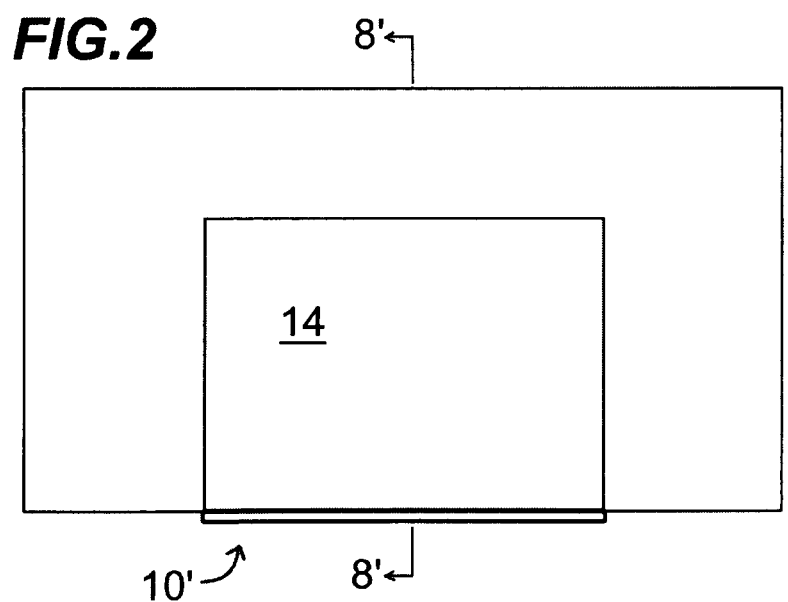
FIG. 2 is a plan view of the embodiment of FIG. 1 mounted on a table top.

Referring to FIGS. 1-3, the present invention is shown in perspective view affixed to one edge of a table top. A top plan view is shown of the multi-use surface residing on the table top of FIG. 1, while FIG. 3 is a sectional view taken along lines 8'-8' of FIG. 2.

FIG. 4 shows the detail of 12' where a generally J-shaped assembly includes an upper fixed member 22 having both rigid horizontal and vertical sections joined at a right angle, a spring hinge assembly 26, and a movable lower member 28. The upper fixed member 22 and lower movable member 28 are essentially leaves of the spring hinge assembly 26 with their proximal ends forming adjacent hinge knuckles of the spring hinge assembly. The upper fixed member 22 and lower movable member 28 are preferably constructed of injected molded plastic such as ABS, polyamide, polypropylene, polyethylene and PVC, but may be of fabricated metal, die-cast metal, sintered metal or any suitably rigid material.

A deformable pad 30 located at the distal end of the lower movable member 28 is made of a soft rubber such as silicone rubber, butyl rubber, EPDM, polyurethane or other material to resist slippage when in contact with the underside of the table.

Figure 11:
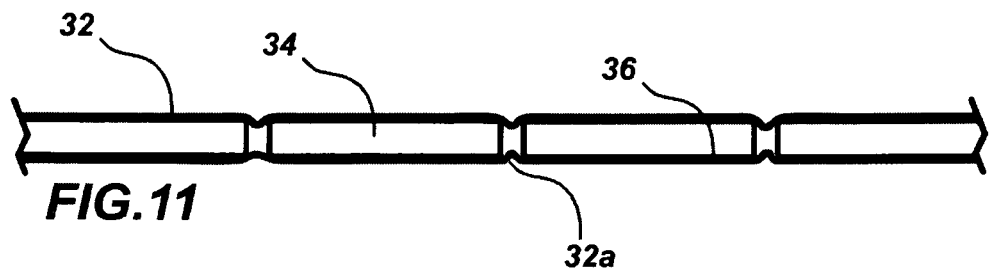
FIG. 11 is partial cross-sectional view of another embodiment according to the present invention showing the extendible mat with spaced rigid slats disposed between a flexible upper and a flexible lower surface.

Extendible mat 14 is positioned flat upon a table when in use, but may be rolled for storage and includes a flexible core disposed between a washable top surface 16 and a slip resistant bottom surface 20. While preferably the extendible mat is of foam backed vinyl where the washable top surface 16 is paired with a bottom facing slip resistant material, as shown in the embodiments of FIG. 11, it may be constructed from a series of longitudinally positioned rigid slats adjacent to one another sandwiched between a flexible upper material such as vinyl, and a flexible bottom of slip resistant material such as open cell neoprene. Preferably, the slats are made of a rigid thermoplastic such as ABS, polyamide, polypropylene, polyethylene, PVC or any suitably rigid material and have a space 32a between each slat so as to enable rolling the mat for storage. When placed on a flat table top, the rigid sections assist the extendible mat in laying flat.

Figure 12:
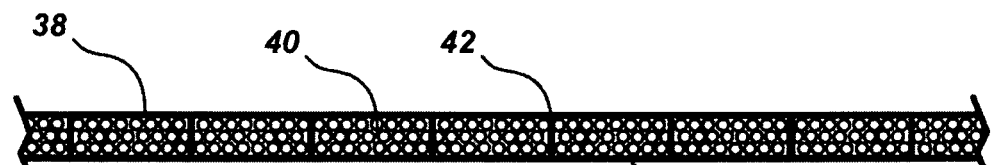
FIG. 12 is partial cross-sectional view of another embodiment according to the present invention showing the extendible mat having bead filled cells disposed between an flexible upper and a flexible lower surface.
Figure 13:
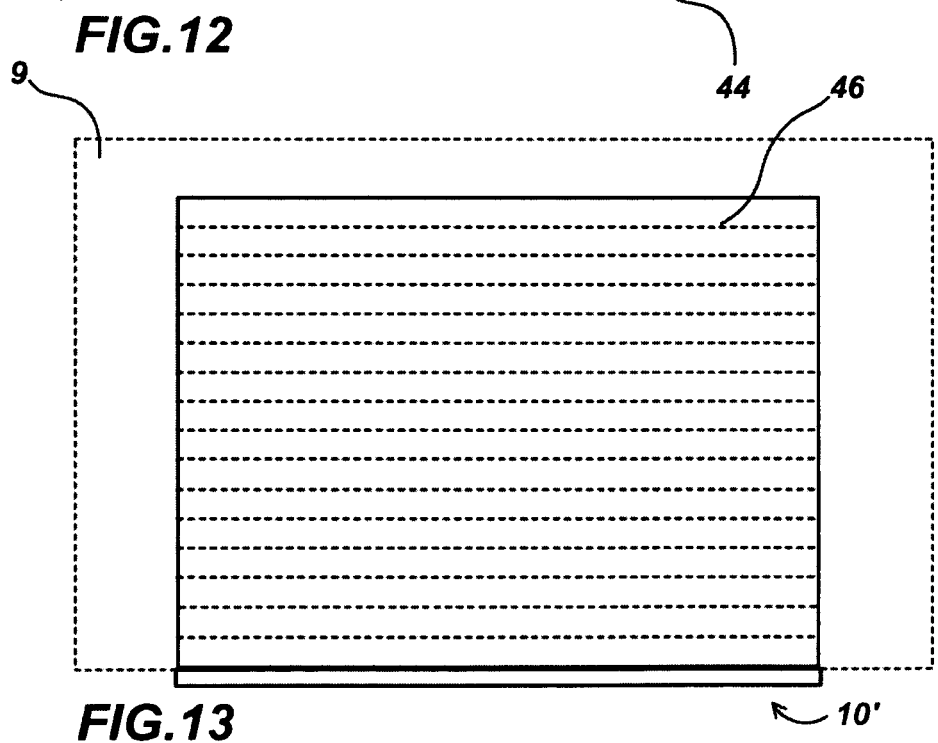
FIG. 13 is top plan view with hidden lines indicating both the relative position of transversely positioned rigid slats of FIG. 11 and transversely positioned bead filled cells FIG. 12.

An embodiment shown in FIG. 12, has a series of adjacent transversely oriented bead filled cells 40 forming rectangular channels disposed between an washable upper material 38 such as sheet vinyl, and a bottom material 44 having slip resistant characteristics. The walls of the bead filled cells 42 are made of vinyl and sealed at the perimeter of the mat by heat sealing, crimping or gluing in order to contain the beads.

A padded bumper guard 24 filled with a shock absorbing material such as a silicone gel, polyester fill, or a closed cell foam insert prevents material placed on the extendible mat from easily rolling off the table's edge. In the preferred embodiment, the bumper guard is joined to that edge of the extendible mat superior to the table lip and above the spring hinge assembly 26, although it is possible that the bumper guard may be widened to extend over the spring hinge assembly completely. The bumper guard also functions as an arm rest and reduces the risk of injury resulting from a child prone to striking the table with their arms or head.

Referring to FIGS. 5-7, the work and play area is shown in a partial view with the movable lower member in various positions determined by the thickness of the table top. Many tables, especially those in the restaurants have either a solid top with no lip as shown in FIG. 5, or a lipped edge as shown in FIG. 6. In either case, the movable lower member is able to apply pressure to the underside of the table securing the work surface thereto. FIG. 7 shows the lower movable member 28 pulled back which precedes either the attachment or detachment of the multi-use surface to or from the table.

Referring to FIGS. 8-9, both side elevations taken from direction a'-a' of FIG. 7; The upper fixed member 22 and lower movable member are joined to one another by the spring hinge assembly 26 which includes three tubular hinge knuckles; comprising two outer knuckles 26b of equal size, and a larger middle knuckle 26a. The three knuckles are in axial alignment and together define a bore 26c which contains a hinge pin 26i extending the length of the hinge assembly and two torsion springs 26d circumjacent the hinge pin and coaxial with the hinge pin. Each torsion spring is located within that part of the bore defined by the two outer knuckles. The two free ends of each torsion spring are connected to a capstan; a first fixed capstan 26g located at each end of the hinge pin and circumjacent and coaxial with the hinge pin and that moves in concert with the hinge pin, and a second mobile capstan 26e that is circumjacent and coaxial with the hinge pin and able to move independently of the hinge pin. A nylon spacer separates each mobile capstan from a third fixed capstan 26f. Each of the two mobile capstans is joined to an outer knuckle 26b, while each of the third fixed capstans is joined to the middle knuckle 26a. The two outer knuckles 26b extend downward to form the movable lower member 28, while the middle knuckle extends upward to form the fixed upper member 22. Capstans 26g and 26e have two apertures (not shown) into which the free ends of the spring 26d are secured thereby torquing the torsion spring when the movable lower member 28 is pulled away from the fixed upper member 22 as the two members are biased by the torsion spring to contract together. While a preferred spring hinge configuration for the present invention has been described, it should be readily understood by one skilled in the art that there are conceivably a number of spring hinge configurations that may be used for the intended purpose, for example a single torsion spring of sufficient thickness could be used, although the described two spring configuration offers superior resistance and clamping force.

Preferably, the table facing surfaces of the upper fixed member 22 is covered with an anti-slip material to provide frictional resistance to movement once applied to a table's edge. In the preferred embodiment, the extendible mat is joined to one edge of the upper fixed member 22 of the J-shaped channel preferably by adhesive, although it is conceivable that snaps, rivets, screws or other means may be used to join the two, while the extendible mat is a generally rectangular piece of layered vinyl FIG. 5, with a smooth washable top surface 16, and a textured slip-resistant bottom surface 20 to resist movement when positioned atop a table. The exterior covering of the padded bumper guard is an extension of the smooth washable top surface 16 of the extendible while an extension of the bottom surface 20 provides the slip-resistant surface of the table facing surface of the upper fixed member 22 of the J-shaped channel. A ridge 24a is formed at the transition where the upper fixed member and the smooth upper layer meet which discourages material from falling off the edge. Generally, the described embodiments share the same clamping arrangement but with variations of the extendible mat. The present invention is applied to a table by manually applying downward pressure to the movable lower member of the J-shaped channel increasing the size of the opening between the upper fixed and lower movable members to accommodate a wide range of table top thicknesses, then positioning the upper fixed member superior to a table lip and the movable lower member inferior to the table lip, and releasing the lower movable member allowing it to spring toward the bottom surface of the table lip securing the play and work area to the table. The extendible mat may then be rolled out on the surface of the table top providing a clean work or play area. Additionally, suction cups may be employed with all of the aforementioned embodiments where they are placed about the bottom periphery of the extendible mat to affix the mat securely to very smooth surfaces such as a glass table top.

Figure 14:
FIG. 14 is a perspective view of another embodiment according to the present invention having a clear vinyl pocket affixed to the upper surface of the extendible mat.

Yet another embodiment shown in FIG. 14 shows a clear sleeve that may be fitted atop any of the aforementioned embodiments so that teaching and play materials may be inserted therein for a child's amusement.

Figure 15:
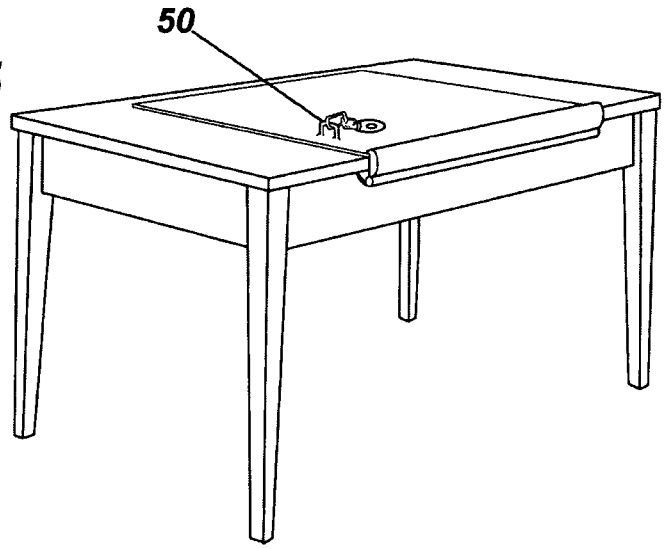
FIG. 15 is a perspective view of another embodiment according to the present invention where the extendible mat has a fixed loop for connecting to play links.

Yet another embodiment according to the present invention in shown in FIG. 15 where a generally 'U' shaped anchor is available to secure play links and playthings.

While the invention has been described by the embodiments given, it is not intended to limit the scope of the invention to the particular forms set forth, but on the contrary, it is intended to cover such alternatives, modifications, and equivalents as may be included within the spirit and scope of the invention as defined by the appended claims.

I claim:

1. A tabletop play and work area comprising:
   1) an extendible mat for contact with the surface of a table top, wherein the mat is soft and resilient; and,
   2) a clamping assembly, including
      i) a fixed upper member joined to a moveable lower member, together resembling a 'J' shape, the members being biased to contract together for securing a lip of a table therebetween, and in which the clamping assembly is joined continuously along one length by the extendible mat, and,
      ii) a spring hinge assembly, and,
      iii) a bumper guard attached along one length of said clamping assembly forming a ridge above the surface of the mat.

2. The tabletop play and work area of claim 1 in which said spring hinge assembly further comprises:
   at least one pair of tubular hinge knuckles in axial alignment together defining a bore; and,
   at least one torsion spring within said bore; and,
   at least one hinge pin within said bore; and,
   each torsion spring circumjacent each hinge pin, and each torsion spring affixed at both ends to a rotationally fixed and a rotationally free capstan,
which are circumjacent and coaxial to each hinge pin.

3. The tabletop play and work area of claim 1 in which said movable lower member and said fixed upper member are joined in axial alignment, said movable lower member and said fixed upper member each proximally terminating in at least one tubular hinge knuckle.

4. The tabletop play and work area of claim 1 in which said extendible mat has a washable upper surface and a skid resistant lower surface.

5. The tabletop play and work area of claim 1 in which said extendible mat has suction cups along at least one edge for affixing to a table surface.

6. The tabletop play and work area of claim 1 in which said extendible mat is made of soft padded vinyl.

7. The tabletop play and work area of claim 1 in which said extendible mat includes a series of transverse rigid slats adjacent to one another and disposed between a flexible upper material and a flexible lower material, and each of the slats having a space between one another.

8. The tabletop play and work area of claim 1 in which said extendible mat includes transverse sealed bead-filled channels disposed between an upper and lower material.

9. The tabletop play and work area of claim 1 in which said extendible mat is capable of being rolled about said clamping assembly for transport and storage.

10. The tabletop play and work area of claim 1 in which said extendible mat has a clear pocket on the upper surface for insertion of pedagogical material.

11. The tabletop play and work area of claim 1 in which said extendible mat further comprising a loop for affixing play links.

12. The tabletop play and work area of claim 1 in which said extendible mat further comprising a series of suction cups about the bottom periphery of said extendible mat.

13. A method of attaching the tabletop play and work area of claim 1 comprising the steps:
   1) pulling back on the movable lower member to widen a gap between the fixed upper and movable lower members; and,
   2) positioning a lip of a table top between said fixed upper and moveable lower members; and,
   3) releasing the movable lower member and allowing the movable lower member to contact a table bottom; and,
   4) extending the extendible mat along the surface of a table, and
      i) pressing down a series of suction cups placed along at least one end of said extendible pad for affixing to a table surface.

\* \* \* \* \*